United States Patent Office 2,878,249
Patented Mar. 17, 1959

2,878,249

PREPARATION OF TRIMERIC HYDROGEN CYANIDE

Fred W. Starks, Tonawanda, N. Y., assignor to E. I. du Pont de Nemours and Company, Wilmington, Del., a corporation of Delaware No Drawing. Application May 9, 1956
Serial No. 583,633

10 Claims. (Cl. 260—248)

This invention relates to simple polymers of hydrogen cyanide and, more particularly, to the hydrogen cyanide trimer and its production.

Hinkel and Dunn, J. Chem. Soc. 1836 (1930), show a process for producing a hydrogen cyanide dimer, $(HCN)_2$, by way of the intermediate hydrochloride $(HCN)_2 \cdot 3HCl$. In this process anhydrous hydrogen cyanide is reacted with anhydrous hydrogen chloride at a low temperature in diethyl ether to give the intermediate and the latter distilled with pyridine or other alkaline compound to yield the polymer. It has been found, in practice, that the composition of the hydrochloride actually lies between $(HCN)_2 \cdot 3HCl$ and $(HCN)_3 \cdot 3HCl$ while the polymer produced on distillation is the trimer, $(HCN)_3$, and not the dimer. It is, in fact, the hitherto unreported symmetrical triazine, a white crystalline thermodynamically stable solid melting at 85° C. and boiling at 113–118° C. Although they considered the compound to be dimeric, Hinkel et al., J. Chem. Soc. 674 (1935), have shown that it can be substituted for hydrogen cyanide in several reactions, as for example, in a Gatterman synthesis with benzene. In addition, the polymer can be utilized to regenerate hydrogen cyanide. Since hydrogen cyanide is a low-boiling toxic liquid or an equally toxic gas, the trimer offers a convenient means of storing and shipping the parent substance.

A primary object of the present invention is development of a novel and useful process for preparing the hydrogen cyanide trimer. Another object of the invention is development of a method for preparing trimeric hydrogen cyanide in improved yield. A further object is development of a process for making hydrogen cyanide hydrochloride in improved yield. Still further objects of the invention will be evident from the remainder of this specification.

I have found that the process of Hinkel can be greatly improved if dimethyl ether or, preferably, the cyclic ether tetrahydrofuran be substituted for diethyl ether in the preparation of the hydrogen cyanide hydrochloride intermediate from which trimeric hydrogen cyanide can then be formed. These two ethers, i.e., diemethyl ether and tetrahydrofuran act as catalytic solvents. Some other ethers can be used in the preparation but not all are effective. Isoamylether, for example, gave practically no conversion in a reaction time of several hours at atmospheric pressure and around 30° C. It may be noted in this connection that, while some observers have obtained no reaction between hydrogen cyanide and hydrogen chloride in the absence of an additional material to serve as a catalyst or solvent, e.g., Mathews and Claisen, J. Chem. Soc. 264 (1882), it is possible to secure some product. Thus a 36% yield was obtained by direct reaction between hydrogen cyanide and hydrogen chloride at −10° C. and about two atmospheres' pressure.

In the preferred procedure of this invention liquid hydrogen cyanide is mixed with the catalytic solvent and gaseous hydrogen chloride passed into the mixture. The resultant hydrogen cyanide hydrochloride is then filtered from the solvent and distilled with a high boiling amine. The actual quantity of catalytic solvent used in the first step is not critical. Thus some improvement in yield can be obtained with only about 5% of the solvent present other than hydrogen cyanide and hydrogen chloride. However, for best results about 50% of the initial reaction mixture should consist of the catalytic ether solvent. Larger quantities of catalytic solvent can be used but are unnecessary. The reaction temperature must be kept at a relatively low value, a temperature of 0° C. or less being preferred but up to 20° C. being tolerable. A suitable temperature range is therefore from −20° C. to +20° C. Atmospheric pressure can be utilized especially at the lower temperatures, but as the temperature rises above about 10° C. higher pressure becomes more important because of the volatility of the hydrogen cyanide. The rate of gas flow is not particularly critical to the invention, but must be adequate to maintain a sufficient volume of reaction mixture.

The following examples illustrate generally various aspects of the invention. The first example, however, shows results obtainable from the procedure of the prior art and affords a background to the other examples.

EXAMPLE 1

A mixture containing 50% ethyl ether and 50% hydrogen cyanide, by weight, was made up in a liter flask. A stream of hydrogen chloride was passed through the mixture at atmospheric pressure and at a velocity sufficient to form visible bubbles. The temperature within the flask was kept at 0° C. by a cooling bath. A conversion of 60% of the hydrogen cyanide to the hydrogen cyanide hydrochloride was obtained in a reaction period of 17 hours. The reaction rate was slow and there was no evidence of any reaction during the first hour.

EXAMPLE 2

The procedure of Example 1 was substantially repeated except that tetrahydrofuran was substituted for ethyl ether. A 98% yield was obtained in 5 hours. Evidence of reaction was observed within 15 minutes after starting the reaction.

EXAMPLE 3

Petroleum ether, the hydrocarbon fraction boiling between 40° and 60° C., was substituted for ethyl ether in the process of Example 1. No yield was obtained in a period of 1.75 hours and there was no evidence of any reaction taking place.

EXAMPLE 4

A run was made in which hydrogen chloride at 1560 mm. pressure was passed through a mixture consisting, by weight, of 95% hydrogen cyanide and 5% tetrahydrofuran. The reaction temperature was held around −10° C. by means of an external cooling bath. A 63% yield was obtained in 1 hour. Evidence of reaction appeared during the first 15 minutes of the reaction period.

EXAMPLE 5

The run of Example 4 was repeated except that methyl ether was substituted for tetrahydrofuran. A 78% yield was secured in 2.5 hours. Evidence of reaction taking place was observed within a few minutes after bringing the components together.

Table

| Solvent | Ratio, Solvent/HCN | Time to Evidence of Reaction | Reaction Period, Hours | Pressure of HCl in Atm. | Conversion, Percent | Temp., °C. |
|---|---|---|---|---|---|---|
| Ethyl ether | 50:50 | 1 hour | 17 | 1 | 60 | 0 |
| Tetrahydrofuran | 50:50 | 15 min | 5 | 1 | 98 | 0 |
| Iso amylether | 50:50 | | 5 | 1 | None | 30 |
| Petroleum ether | 50:50 | | 1.75 | 1 | None | 0 |
| Nitrobenzene | 50:50 | 1 hour | 5.00 | 1 | 9 | 0 |
| None | 0:100 | | (indefinite) | 1 | None | 0 |
| Methyl ether | 5:95 | 5 min | 2.5 | 2 | 78 | −8 to +14 |
| Tetrahydrofuran | 5:95 | do | 1.0 | 2 | 68 | −7 to +9 |

From a study of the accompanying table and from other evidence it has been discovered that the solvent to be effective in promoting the reaction of hydrogen cyanide with hydrogen chloride to form the solid hydrochloride of the dimer or trimer of HCN must be a catalyst as well as being purely a solvent for the reactants. It is also evident that the amount of effective solvent required as related to the liquid hydrogen cyanide in the reaction mixture is not critical but may vary from less than 5% to more than 50% by weight.

The reaction temperature may be varied over a rather wide range but the lower limit will be around −20° C. because the mixture will tend to solidify since hydrogen cyanide by itself freezes at about −14° C. In the mixture solidification due to freezing takes place at a temperature below −14° C. depending upon the proportions of reactants and catalytic solvent present. The upper temperature limit is dependent upon the volatility of the reaction mixture but may be raised if the pressure is also raised. In general a temperature of up to +25° C. may be used but for partical purposes a temperature not much above +20° C. is suitable. At temperatures above +30° C. the polymer formed tends to be unstable and therefore higher temperatures are preferably avoided. Accordingly the temperature range between about −20° C. and about +20° C. is preferred. The pressure is necessarily high enough to prevent excessive volatiliation of reactants from the reaction system, but for operations around 0° C. and down to about −20° C. a pressure of about one atmosphere is suitable and for temperatures at about +20° C. the pressure should preferably be about two atmospheres. Higher pressures may be used but the advantage derived therefrom is minor.

The catalytic reactivity of the ether depends upon the basicity of the ether oxygen. The basicity of the diethyl ether oxygen is less than that of the dimethyl ether and of tetrahydrofuran as well as of the mono- and dimethyl tetrahydrofurans and of the mono- and di-ethyl tetrahydrofurans.

The products of the runs described above were identical white crystalline solids and possessed a composition lying between $(HCN)_2 \cdot 3HCl$ and $(HCN)_3 \cdot 3HCl$. This material can be treated with an amine such as quinoline or pyridine and distilled at 110–130° C. to yield the desired hydrocyanic acid trimer which has been identified as the symmetrical triazine. A typical reaction may be written:

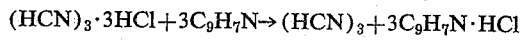

$$(HCN)_3 \cdot 3HCl + 3C_9H_7N \rightarrow (HCN)_3 + 3C_9H_7N \cdot HCl$$

The best results were, in fact, obtained when quinoline, $C_9H_7N$, was used as the agent to remove hydrogen chloride from the hydrogen cyanide polymer. In practice the precipitated hydrochloride was filtered from the reaction medium, preferably tetrahydrofuran, and a stoichiometric quantity of quinoline added thereto. In this manner an over-all yield of the trimer of 36%, based on the hydrogen cyanide originally used, could be obtained. The reaction with quinoline also produced a small amount of monomolecular hydrogen cyanide.

The chief function of the amine is to combine with the hydrogen chloride adduct of the crystalline solids reaction products so as to liberate the latter for distillation. Accordingly any amine whose hydrochloride is stable under distillation conditions for the volatilization of the hydrogen chloride dimer or trimer can be used. In general a heterocyclic amine is preferred over other types of amines.

Various modifications in the practice of this invention will be evident to those skilled in the art. It is not essential, for example, that tetrahydrofuran be used as such. Some tetrahydrofuran derivatives such as mono- and diethyl tetrahydrofurans, the ethyltetrahydrofurans and, in general, the lower mono- and dialkyl tetrahydrofurans can be substituted for the parent material. Here the term "lower" refers to aliphatic chain lengths of about 1–3 carbon atoms. The order of adding reactants is also not critical. If, however, anhydrous hydrogen cyanide is added to hydrogen chloride, enough of the solvent must be utilized to dissolve the latter material. Furthermore, the reaction is not restricted to one or two atmospheres pressure. Other superatmospheric pressures can be utilized if desired; but, since ambient pressure is satisfactory, if the proper choice of solvent is made, it is preferred. Some latitude can also be allowed in reaction temperature, the plus or minus 20° C. range referred to previously being satisfactory. For best results, however, a temperature of 0° C. or lower should be chosen.

This application is a continuation-in-part of my copending application Serial Number 356,105, filed May 19, 1953, now abandoned.

Having now described the invention, I claim:

1. In the process for the production of a polymer of hydrogen cyanide the improvement which comprises reacting anhydrous hydrogen chloride with anhydrous hydrogen cyanide at a temperature no greater than about 20° C. in the presence of upwards of about 5% by weight of an ether of the group consisting of dimethyl ether, tetrahydrofuran and the mono- and dimethyl and mono- and diethyl tetrahydrofurans to produce a polymer having a composition lying between $(HCN)_2 \cdot 3HCl$ and $(HCN)_3 \cdot 3HCl$.

2. The improvement in the method of preparing hydrogen cyanide hydrochloride having a composition lying between $(HCN)_2 \cdot 3HCl$ and $(HCN)_3 \cdot 3HCl$ which comprises passing hydrogen chloride into a mixture of hydrogen cyanide and upwards of about 5% by weight of an ether of the group consisting of dimethyl ether, tetrahydrofuran and the mono- and dimethyl and mono- and diethyl tetrahydrofurans at a temperature of about 0° C.

3. The method of claim 1 in which the temperature is between about −20° C. and +20° C.

4. In the process for the production of a polymer of hydrogen cyanide the improvement which comprises passing anhydrous hydrogen chloride into an anhydrous mixture containing between about 5% and 50% by weight of hydrogen cyanide and between about 5% and 50% by weight of tetrahydrofuran at a pressure of at least one atmosphere and at between plus and minus 20° C. and separating hydrogen cyanide hydrochloride having a composition lying between $(HCN)_2 \cdot 3HCl$ and $(HCN)_3 \cdot 3HCl$ from said mixture.

5. In the process for the production of a polymer of hydrogen cyanide the improvement which comprises passing anhydrous hydrogen chloride into an anhydrous mixture containing between about 5% and 50% by weight of hydrogen cyanide and between about 5% and 50% by weight of dimethyl ether at a pressure of at least one atmosphere and at between plus and minus 20° C. and separating hydrogen cyanide hydrochloride having a composition lying between $(HCN)_2 \cdot 3HCl$ and $(HCN)_3 \cdot 3HCl$ from said mixture.

6. In the process for the production of a polymer of hydrogen cyanide the improvement which comprises passing anhydrous hydrogen chloride into anhydrous hydrogen cyanide containing between about 5% and 50% by weight of dimethyl ether at about atmospheric pressure and at between plus and minus 10° C. and separating hydrogen cyanide hydrochloride having a composition lying between $(HCN)_2 \cdot 3HCl$ and $(HCN)_3 \cdot 3HCl$ from said mixture.

7. In the process for the production of a polymer of hydrogen cyanide the improvement which comprises passing anhydrous hydrogen chloride into anhydrous hydrogen cyanide containing between about 5% and 50% by weight of tetrahydrofuran at about atmospheric pressure and at between plus and minus 10° C. and separating hydrogen cyanide hydrochloride having a composition lying between $(HCN)_2 \cdot 3HCl$ and $(HCN)_3 \cdot 3HCl$ from said mixture.

8. The improvement in the process for preparing trimeric hydrogen cyanide which comprises reacting anhydrous hydrogen chloride and anhydrous hydrogen cyanide in the presence of upwards of about 5% by weight of an ether of the group consisting of dimethyl ether, tetrahydrofuran and the mono- and dimethyl and the mono- and diethyl tetrahydrofurans and distilling the white crystalline solid so produced with a heterocyclic amine selected from the group consisting of pyridine and quinoline at about 110°–130° C.

9. The improvement in the process for preparing trimeric hydrogen cyanide which comprises reacting anhydrous hydrogen cyanide and anhydrous hydrogen chloride in the presence of about 5–50% by weight of tetrahydrofuran and subsequently distilling the white crystalline solid so produced in the presence of heterocyclic amine selected from the group consisting of pyridine and quinoline.

10. The improvement in the process for preparing trimeric hydrogen cyanide which comprises reacting anhydrous hydrogen cyanide and anhydrous hydrogen chloride in the presence of about 5–50% by weight of dimethyl ether and subsequently distilling the white crystalline solid so produced in the presence of heterocyclic amine selected from the group consisting of pyridine and quinoline.

References Cited in the file of this patent

FOREIGN PATENTS

| 532,158 | Great Britain | Jan. 17, 1941 |
| 661,845 | Great Britain | Nov. 28, 1951 |

OTHER REFERENCES

Hinkel et al.: J. Chem. Soc. (London), 1930, pp. 1834–39.

Pfeil et al.: Chem. Ber., 85, 293–307 (1952), note, p. 299; also see abstract in Chemical Abstracts, vol. 47 (1953), pp. 1587–1589, note, 1588b.

Hinkel et al.: J. Chem. Soc. (London), 1935, pp. 674–679.

Grundmann et al.: J. Am. Chem. Soc., vol. 76, pp. 632–633; 5646–5650 (1954).